United States Patent
Bullard, Jr.

(10) Patent No.: US 8,364,953 B2
(45) Date of Patent: Jan. 29, 2013

(54) SYSTEM AND METHOD FOR PROVIDING SECURED ELECTRONIC TRANSACTIONS

(75) Inventor: James C. Bullard, Jr., Memphis, TN (US)

(73) Assignee: United States Postal Service, Washington, DC (US)

( * ) Notice: Subject to any disclaimer, the term of this patent is extended or adjusted under 35 U.S.C. 154(b) by 716 days.

(21) Appl. No.: 12/289,060

(22) Filed: Oct. 20, 2008

(65) Prior Publication Data

US 2009/0119512 A1  May 7, 2009

Related U.S. Application Data (63) Continuation of application No. 12/073,208, filed on Mar. 3, 2008, now abandoned, which is a continuation of application No. 11/810,275, filed on Feb. 22, 2005, now abandoned, which is a continuation of application No. 10/485,857, filed on Feb. 5, 2004, now abandoned, which is a continuation of application No. PCT/US02/25075, filed on Aug. 7, 2002.

(60) Provisional application No. 60/310,233, filed on Aug. 7, 2001.

(51) Int. Cl.
*H04L 29/06* (2006.01)
*G06F 21/00* (2006.01)
*G06Q 40/00* (2012.01)

(52) U.S. Cl. ............ 713/156; 713/157; 705/50; 705/51; 705/44

(58) Field of Classification Search .................... 705/50, 705/51, 44; 713/156, 157
See application file for complete search history.

(56) References Cited

U.S. PATENT DOCUMENTS

| | | | |
|---|---|---|---|
| 5,940,187 A * | 8/1999 | Berke | 358/434 |
| 6,199,052 B1 | 3/2001 | Mitty et al. | |
| 6,223,291 B1 | 4/2001 | Puhl et al. | |
| 6,226,618 B1 | 5/2001 | Downs et al. | |
| 6,253,193 B1 | 6/2001 | Ginter et al. | |
| 7,289,971 B1 * | 10/2007 | O'Neil et al. | 705/44 |
| 2002/0038290 A1 * | 3/2002 | Cochran et al. | 705/50 |
| 2002/0143704 A1 * | 10/2002 | Nassiri | 705/51 |
| 2002/0147905 A1 * | 10/2002 | Perlman | 713/157 |
| 2005/0085931 A1 * | 4/2005 | Willeby | 700/89 |

OTHER PUBLICATIONS

International Search Report for International Application No. PCT/US02/25075 dated Dec. 18, 2002 (2 pages).
International Search Report for International Preliminary Examination Report No. PCT/US02/25075 dated Sep. 28, 2004 (3 pages).

* cited by examiner

*Primary Examiner* — Philip Lee
(74) *Attorney, Agent, or Firm* — Finnegan, Henderson, Farabow, Garrett & Dunner, LLP (57) ABSTRACT

Methods and systems are provided for a secured electronic communication in a network that includes a verification station, a registration station, and a authentication station. At the registration station, a request for a digital certificate is received from a user. The registration station instructs the verification station to forward to the user a message associated with the request. The message is compared against the user at the authentication station to determine whether the message properly identifies the user. A first signal indicating the result of the comparison is sent to the verification station. If the first signal indicates that the message properly identifies the user, a second signal is sent to the registration station. Based on the second signal, the registration system then generates a digital certificate.

17 Claims, 6 Drawing Sheets

SYSTEM AND METHOD FOR PROVIDING SECURED ELECTRONIC TRANSACTIONS

CROSS REFERENCE TO RELATED APPLICATIONS

The present application is a continuation of, and claims the benefit of, U.S. patent application Ser. No. 12/073,208 filed Mar. 3, 2008 now abandoned, which is a continuation of U.S. patent application Ser. No. 11/810,275 filed Feb. 22, 2005 (now abandoned), which is a continuation of U.S. patent application Ser. No. 10/485,857 filed Feb. 5, 2004 (now abandoned), which is a continuation of PCT International Application No. PCT/US02/25075, filed Aug. 7, 2002, which is related to and claims the benefit and priority of U.S. Provisional Application No. 60/310,233 filed Aug. 7, 2001, in the name of James C. Bullard, Jr., and titled APPARATUS AND METHODS FOR PROVIDING A DIGITAL CERTIFICATE, all of which are fully incorporated herein by reference.

TECHNICAL FIELD

This invention relates generally to a system and method for providing secured electronic communication between parties, and more particularly, to a system and method for providing a digital certificate that may be used in electronic communications to ensure the integrity of an electronic transaction.

BACKGROUND

Presently, consumers and businesses exchange vast amounts of information in order to engage in a business transaction or sale. In traditional business transactions, consumers use accepted means of payment to purchase items at a store or another place of business. In exchange, businesses offer goods or services in consideration of the payment by the consumers. In many instances, businesses use security methods to verify the method of payment, for example verifying through a driver's license that a consumer is the same as the individual identified on a credit card.

As electronic communication becomes more popular as a means for transacting business, through for example the Internet, consumers and businesses desire a more secured form of electronic communication. For example, it is desired that a credit card number electronically sent to a business is not intercepted or used improperly. For e-business transactions to become more widely accepted, consumers must use the electronic services provided by businesses, and businesses must be able to ensure the security of such electronic transactions. Otherwise, the advantages of an electronic commerce environment will not be realized, due to a lack of participation or demand by consumers and businesses. Therefore, businesses and consumers who communicate electronically need to know that their respective messages are private and need to verify the identity of a sender.

To ensure that transactions take place smoothly between parties, it is essential that the parties not only trust the communication path but also have assurances regarding the integrity of the information transmitted and the identity of the party transmitting the information. Without this assurance, the possibility of fraud, either unintentional or purposeful, could undermine the ability of parties to effectively engage in electronic commerce.

In modern electronic commerce environments, digital certificates are used to prevent interception of transactions and to allow authentication and verification of the transactions. For example, a digital certificate makes it possible to verify someone's claim that they have the right to use a given key in a key-based security scheme, which helps prevent unauthorized users from impersonating a rightful user. Digital certificates, used in conjunction with encryption, provide a more complete security solution by assuring the identity of all parties involved in an electronic transaction.

It is therefore desirable to provide systems and methods to allow for the secure and reliable exchange of information between parties utilizing electronic communication.

SUMMARY

Methods and systems are provided for a secured electronic communication in a network that includes a verification station, a registration station, and a authentication station. At the registration station, a request for a digital certificate is received from a user. The registration station instructs the verification station to forward to the user a message associated with the request. The message is compared against the user at the authentication station to determine whether the message properly identifies the user. A first signal indicating the result of the comparison is sent to the verification station. If the first signal indicates that the message properly identifies the user, a second signal is sent to the registration station. A digital certificate is generated at the registration station upon receipt of the second signal.

A system for a secured electronic communication comprises a verification station, a registration station, and an authentication station. The registration station is configured to communicate with the verification station, receive a request for a digital certificate from a user, and to instruct the verification station to forward to the user a message associated with the request. The authentication station is configured to communicate with the verification station, compare the message against information about the user, and to send a first signal to the verification station indicating the result of the comparison. If the first signal indicates the message properly identifies the user, the verification station sends a second signal to the registration station such that the digital certificate is generated based on the second signal.

Additional features and advantages will be set forth in part in the description which follows, and in part will be obvious from the description, or may be learned by practice of the claims. The advantages will be realized and attained by means of the elements and combinations particularly pointed out in the appended claims.

It is to be understood that both the foregoing general description and the following detailed description are exemplary and explanatory only and are not restrictive of the appended claims.

BRIEF DESCRIPTION OF THE DRAWINGS

In the figures.

DETAILED DESCRIPTION

Figure 1:
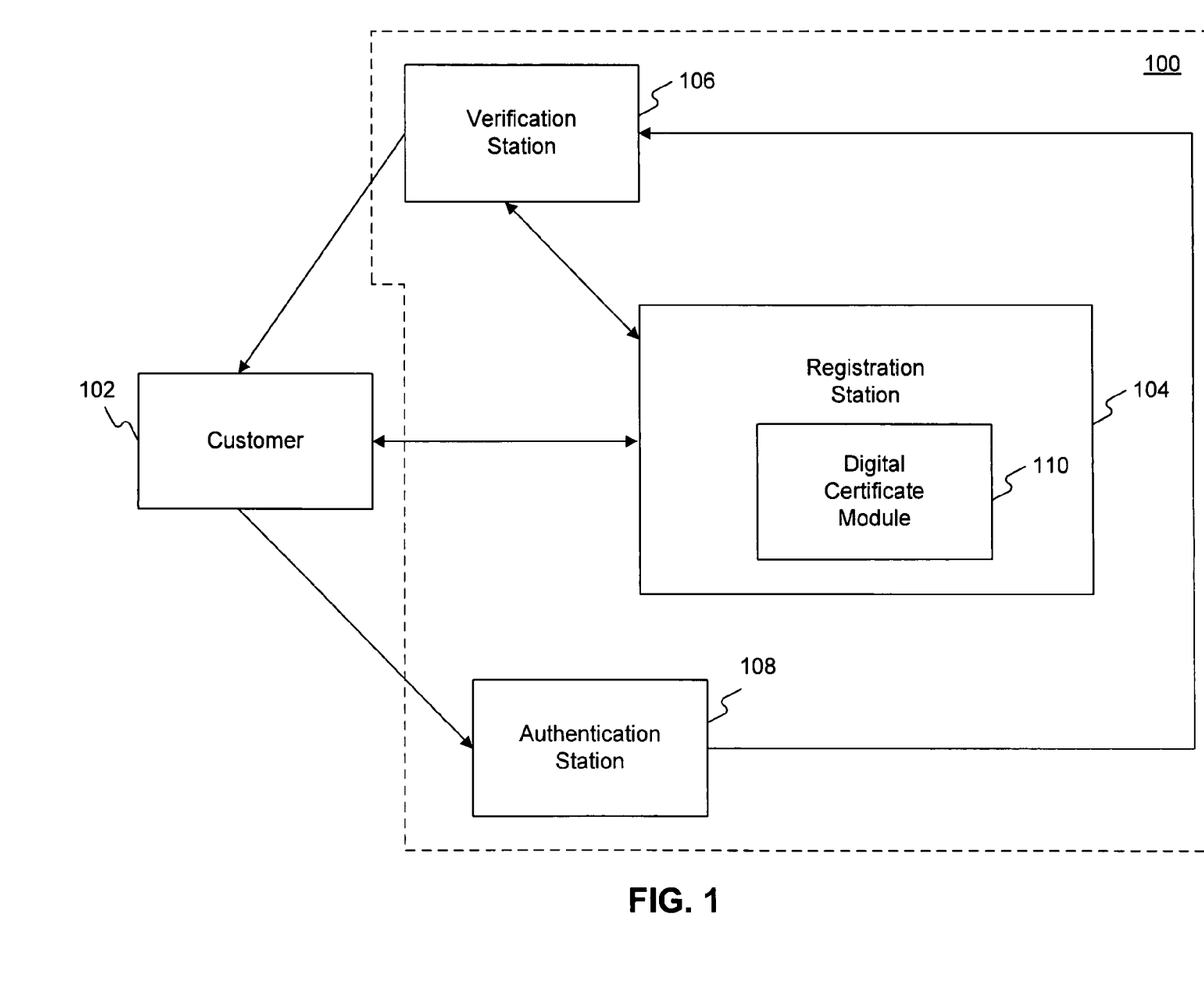
FIG. 1 is a block diagram of a system for providing secured electronic communication.

Referring now to the drawings, in which the same reference numbers will be used throughout the drawings to refer to the same or like parts, FIG. 1 is a block diagram of a system 100 providing secured electronic communication to a customer 102. System 100 may include a registration station 104, a verification station 106, and an authentication station 108. Registration station 104, which communicates with customer 102 and verification station 106, may include a digital certificate module 110. Verification station 106 communicates with customer 102 and authentication station 108, in addition to registration station 104. Customer 102 also communicates with authentication station 108.

Registration station 104 may receive a request for a digital certificate from customer 102. The request may include account information to identify customer 102 with the digital certificate. The account information may include information, such as first name, last name, and social security number. When registration station 104 receives the request from customer 102 along with the account information, registration station 104 may instruct verification station 106 to send a message to customer 102. The contents of the message may include the account information that customer 102 sends to registration station 104. Customer 102 may take the message to authentication station 108, where an operator checks the message and compares the accuracy of the information provided in the message against identification supplied by customer 102.

Authentication station 108 may communicate the result of the comparison to verification station 106. If authentication station 108 determines that the message properly identifies customer 102, then verification station 106 communicates to registration station 104 that a digital certificate should be generated for customer 102. Registration station 104 may determine if the digital certificate can be issued (e.g., if there is another individual with the same information as customer 102, then a digital certificate cannot be issued) and if so, generates a digital certificate in favor of customer 102 through digital certificate module 110.

Figure 2:
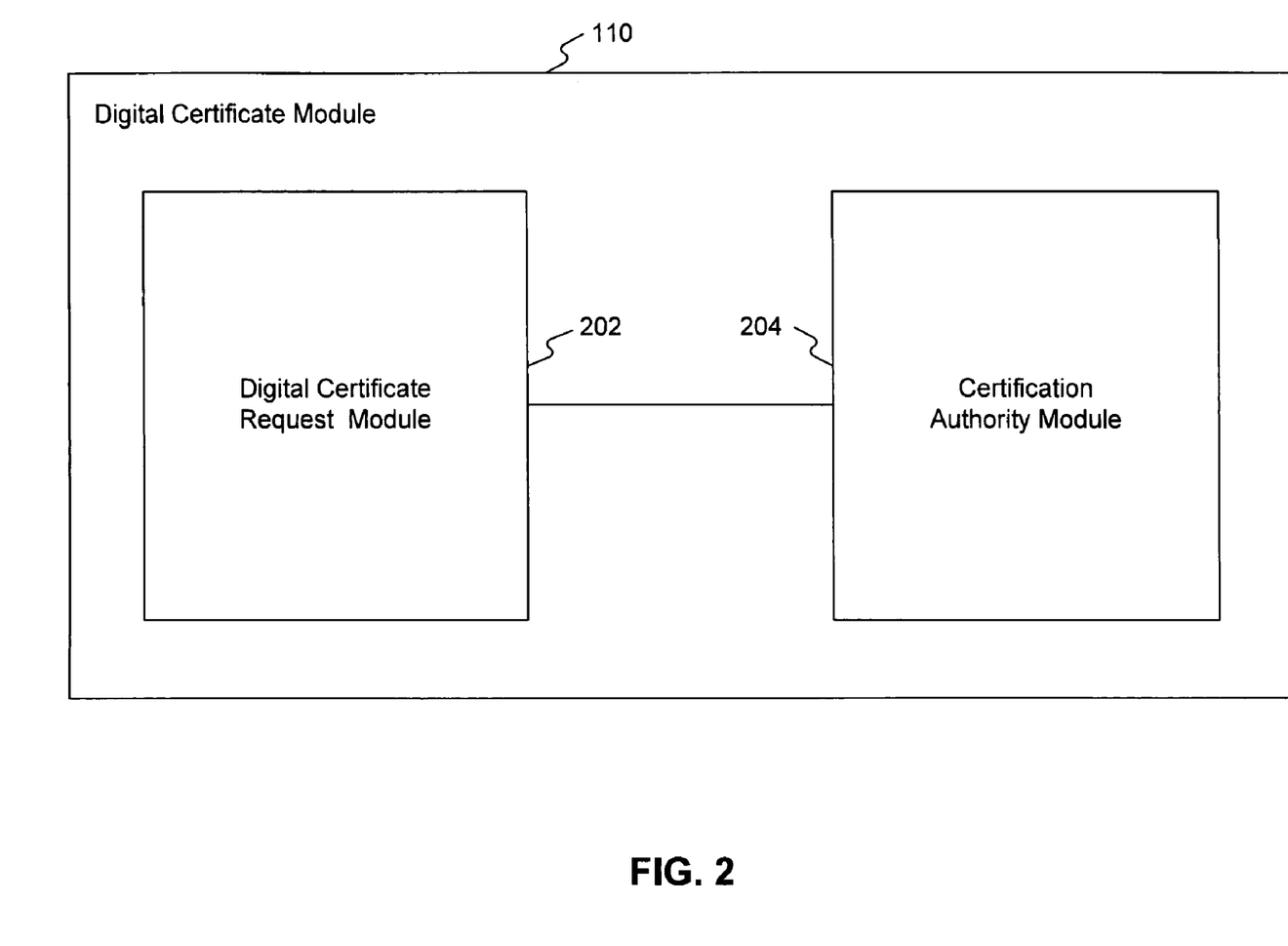
FIG. 2 is a block diagram illustrating a digital certificate module in a system for providing secured electronic communication in greater detail.

FIG. 2 is a block diagram of digital certificate module 110 in greater detail. Digital certificate system 110 may include a digital certificate request module 202 and certification authority module 204. Once verification station 106 receives a communication from authentication station 108 that customer 102 is properly identified with the account information, request module 202 may send a request to certification authority module 204. Certification authority module 204 may determine if the request for the digital certificate can be processed. For example, certification authority module 204 could return one of two responses to the request for a digital certificate from request module 202—either the digital certificate or an error message. Error messages may be separated into two different kinds, a lesser error or a greater error. A lesser error may occur when an event, such as a technical difficulty that can be resolved by retransmission is detected. However, a greater error may occur when it is impossible for certification authority module 204 to issue a digital certificate (e.g., a digital certificate already exists for customer 102).

Figure 3:
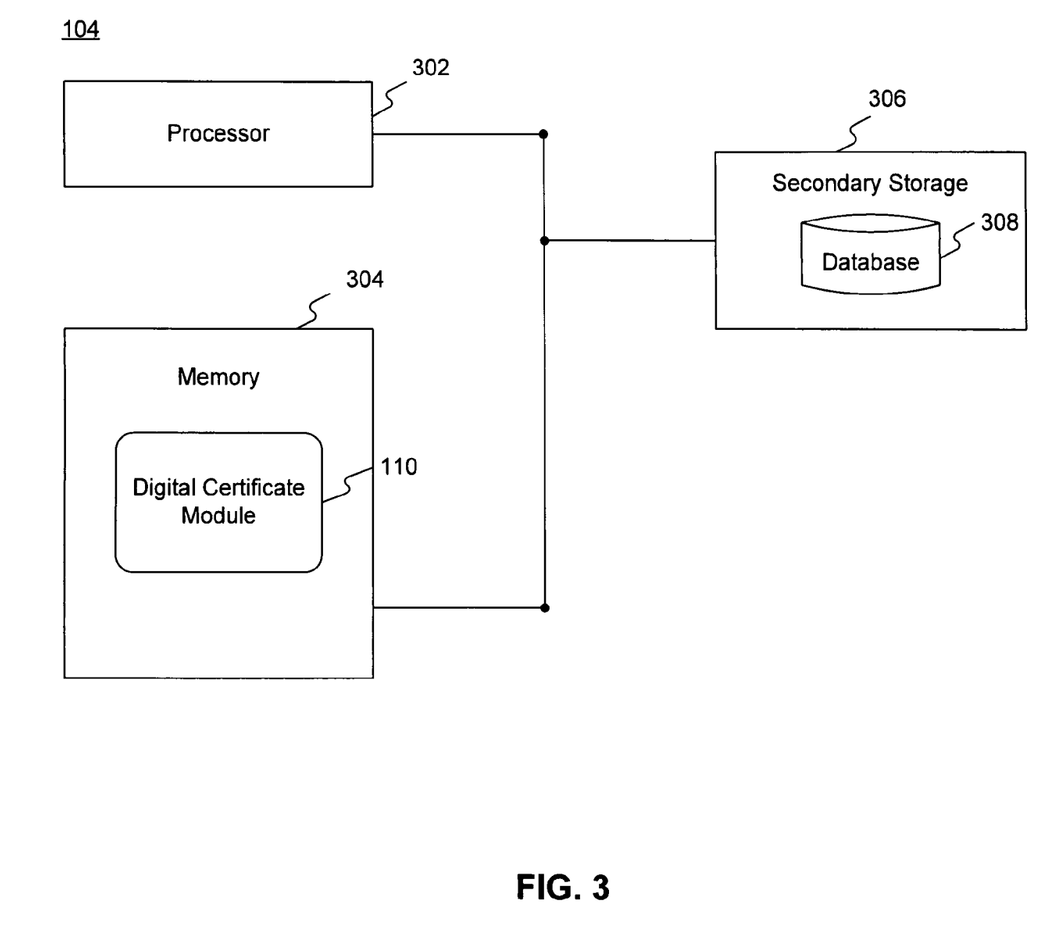
FIG. 3 is a block diagram showing a registration station in a system for providing secured electronic communication in greater detail.

FIG. 3 is a block diagram showing registration station 104 in further detail. Registration station 104 may include a processor 302, a memory 304, and a secondary storage 306. Memory 304 may further include digital certificate module 110, and secondary storage 306 may include a database 308. As shown in FIG. 3, digital certification module 110 may be a program stored in memory 304 and executed by processor 302.

Figure 4:
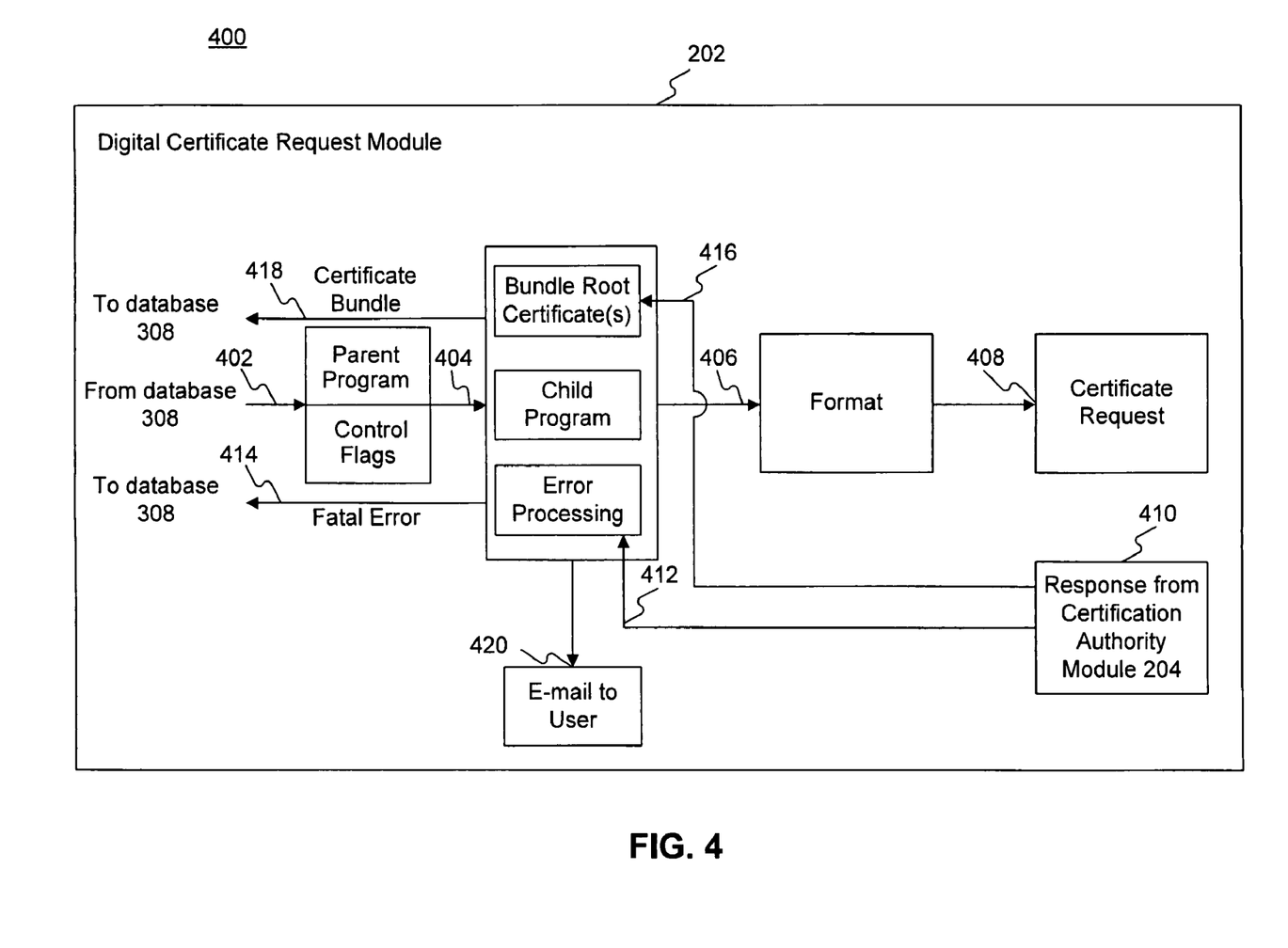
FIG. 4 is a flowchart of tasks performed by a digital certificate request module in a system for providing secured electronic communication.

FIG. 4 is a flowchart 400 of tasks performed by digital certificate request module 202. Flowchart 400 begins at stage 402 where a parent program accesses database 308. Control flags may exist as part of the parent program to ensure quality of the retrieved accounts. The three control flags may be used to determine which account in database 308 is ready to be processed and which account may be ignored. The first flag may ensure that the account has been activated. For example, the first flag may ensure that customer 102 entered information into registration station 104, took the message to authentication station 108, authentication station 108 verified the message and notified verification station 106, and the account is active within database 308.

The second flag may ensure that customer 102 has registered for an account that uses a digital certificate (i.e., customer 102 is registered for a product that uses a digital certificate). The third flag ensures that the account is pending processing. In other words, the third flag ensures that the account has either been newly generated and waiting for certification authority module 204 to assign a digital certificate, or the account is waiting in database 308 due to previous responses that generated and that resulted in error. Responses to digital certificate requests are explained below.

If the three flags are met, then the account record for customer 102 may be submitted for processing and pulled from database 308. At stage 404, the parent program may generate a clone program, also called a child program, and give the account information for customer 102 to the child program. The child program may format the information of customer 102 into a digital certificate request, at stage 406, and then transmit the digital certification request to certificate authority module 204 at stage 408.

Next, at stage 410, certification authority module 204 may generate and return one of two responses to the digital certification request module 202—either an error message or a digital certificate.

If the response is an error message, error processing may occur at stage 412. The error may be categorized into one of two categories: a lesser error or a fatal error. A lesser error may occur when, for example, there is noise on the transmission line between digital service request module 202 and certification authority module 204. The result is that database 308 would be flagged to try that record again later. However, if a fatal error occurs, at stage 414, the request for a digital certificate will be aborted and the record is skipped by subsequent searches on database 308. For example, if customer 102 is named "John Smith" and submits information on an application indicating first name "John" and last name "Smith," customer 102 is assigned a digital certificate. If another individual named "John Q. Smith" also fills out an application indicating first name "John" and last name "Smith" with no middle initial, this would generate an error message because customer 102 named "John Smith" is already in database 308. Notably, other implementations are possible, providing for any number of error conditions.

If no error exists, certification authority module 204 may return a digital certificate at stage 416. The digital certificate may be bundled with one or more root certificates by digital certification request module 202 and the digital certificate bundle may be stored in database 308. A root certificate may allow verification that digital certificates from certification authority module 204 are the most current and valid. The digital certificate, together with the digital certificate bundle, is transmitted to the Internet web browser belonging to customer 102, and the root certificate is stored in the browser's certificate storage. Typically, Internet web browser's have access to a storage containing trusted certificates.

At stage 416, the root certificate referenced may not be included in the browser certificate store of customer 102. Thus, in order to make the digital certificate that is issued to customer 102 useful, the root certificate may be bundled with the digital certificate and transmitted to the Internet web browser of customer 102. If the certificate generation is successful, the information may be stored in database 308 at stage 418. In addition, at stage 420, a confirmation e-mail may be sent to customer 102 indicating that the digital certificate has been issued by certification authority module 204.

The digital certificate module 110 may also support a set of command line parameters in order to allow more versatility in operation and control over digital certificate request module 202. These parameters are listed in Table 1.

TABLE 1

Command-line parameters:

| | |
|---|---|
| -a | Specify account number of individual account to be processed |
| -b | Set the base path |
| -c | Specify the location of the "Mail Command" script file |
| -d | Specify name of database to be used |
| -e | Specify Email address to which Conformation Message will be sent |
| -f | Specify the location of the text file containing the Failure Message |
| -h | Help. Generate usage statement. |
| -i | Specify Input File/Configuration File |
| -l | Unlock all records (crash recovery) |
| -m | Specify location of text file containing Confirmation Message |
| -n | Normal processing with default values |
| -o | Specify Email address for Operator/Administrator |
| -p | Specify database password |
| -r | Indicate the certificate files should be removed from hard drive upon successful completion |
| -t | Specify number of times parent process should run |
| -u | Specify username for database login |
| -v | Indicate that only the record with this "vanity name" (username/logon id) is to be processed |
| -x | Specify Debug mode (verbose logging output) |
| -z | Indicate the number of seconds the parent process should sleep in between database checks |

The following are a description of the parameters listed in Table 1.

-a: This command followed by an account number and instructs digital certificate request module 202 to process records associated with that account number.

-b: This command sets the base path for the operation of digital certificate request module 202 and allows an administrator to store and run digital certificate request module 202 at different locations. The base path is the highest level system directory of digital certificate request module 202.

-c: This command specifies the location of the script file that sends the confirmation e-mail message at stage 420.

-d: This command allows the administrator to specify the name of databases, including database 308, that digital certificate request module 202 will search in its operation, for example at stage 402. The administrator may have multiple databases or multiple projects being run from registration station 104.

-e: This command allows the administrator to specify an e-mail address to which the e-mail confirmation message will be sent at stage 420.

-f: This commands lets the administrator give the file name for the text file containing a failure message which may be sent to the administrator indicating that a problem occurred with digital certificate request module 202.

-h: This command specifies that a help message will be generated by digital certificate request module 202.

-l: This command allows the administrator to specify an input or configuration file with information that will be needed for generating the digital certificate request, for example an IP address, a proxy, or a port necessary for contacting certification authority module 204 or the directory where the digital certificates will be stored.

-l: This command may be used in the event of crash recovery to reset all of the records that may have been in progress at the time of the crash. This command notifies database 308 to go to an unlocked state ready to be read by the next process.

-m: This command specifies the file name of the text file containing the e-mail confirmation message which gets sent to customer 102 at stage 420.

-n: This command sets a default flag, which may run digital certificate request module 202 under default values.

-o: This command specifies the e-mail address for the administrator. This is where any failure messages will be sent notifying the administrator of a problem.

-p: This command specifies the password for signing into a database to be searched, for example database 308.

-r: This command is a clean-up indicator indicating that once the digital certificates have been generated and bundled, they are to be removed from a hard drive and stored in database 308.

-t: This command is used primarily during a debug mode and specifies a number of times the process should check database 308, for example stage 402.

-u: This command specifies the user name necessary for logging into a database to be checked, for example database 308.

-v: This command allows a record with a particular name, which can be similar to individual's name or a log-on identification name, to be processed.

-x: This command indicates that the administrator is in a debug mode.

-z: This command specifies the number of seconds to wait between checks to database 308, for example, at stage 402

Figure 5:
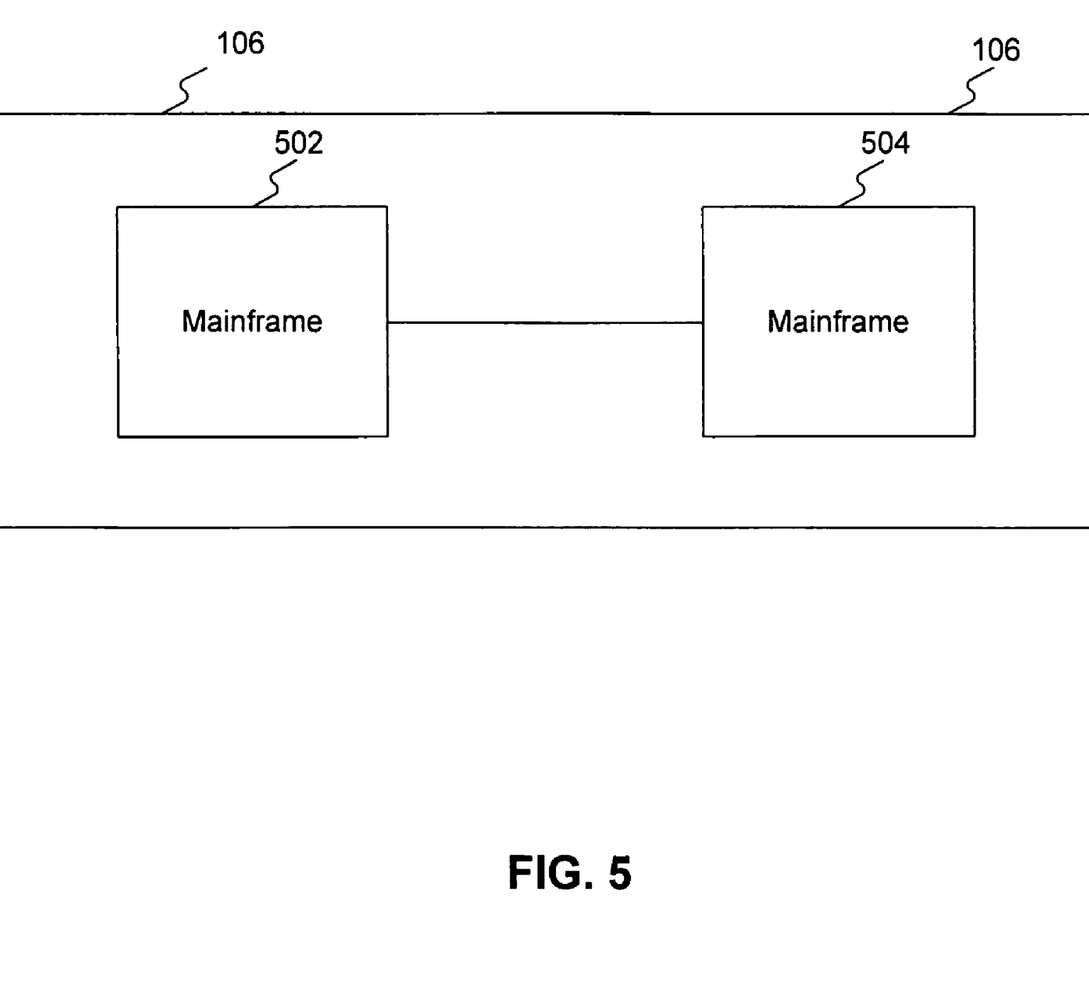
FIG. 5 is a block diagram showing a verification station in a system for providing secured electronic communication in greater detail.

FIG. 5 is a block diagram showing verification station 106 in greater detail. Verification station 106 may include a customer service mainframe 502 and a delivery confirmation mainframe 504. Mainframes 502 may communicate with mainframe 504 to provide secured electronic communication. Mainframe 502 may be a national customer service center (NCSC) mainframe, which handles the request for messages from registration station 104 and generates messages to go out to customer 102. Mainframe 504 may be a delivery confirmation mainframe, which handles the verified messages back from authentication station 108.

Figure 6:
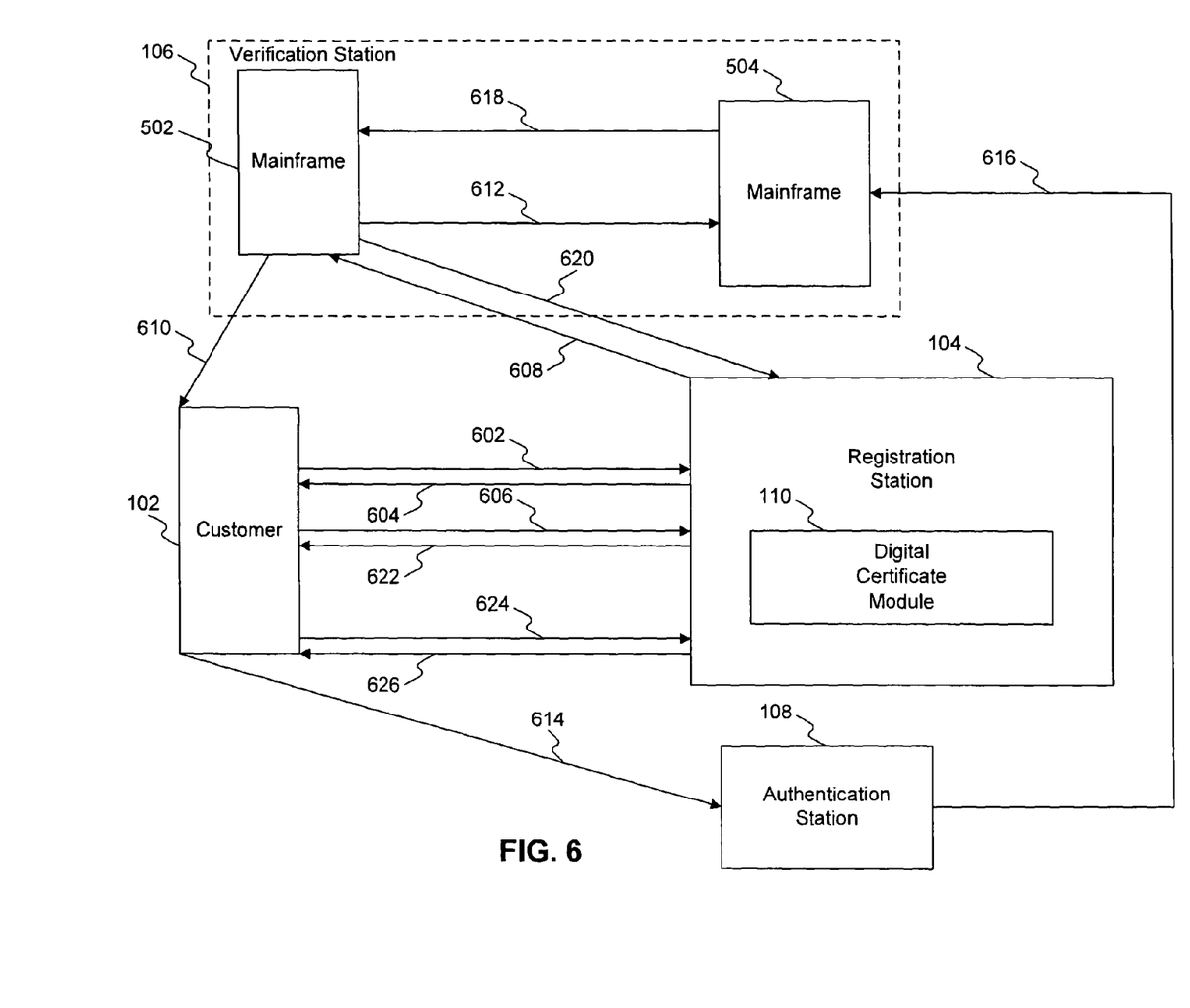
FIG. 6 is diagram showing a message flow within a system for providing secured electronic communication.

FIG. 6 is diagram showing a message flow 600 within system 100. Message flow 600 begins at step 602 where customer 102 may provide registration information to registration station 104. At step 604, registration station 104 may request a public key from the internet web browser of customer 102. At step 606, the browser of customer 102 may send the public key to registration station 104 may, and registration station 104 may store the public key in database 308.

Registration station 104 may request the public key from the browser of customer 102. For example, registration station 104 may pass a command to the browser of customer 102 telling it to generate a complex mathematical data set called a public key and a private key. Customer 102 may retain the private key while the public key is sent to registration station 104. This function may happen automatically in the browser of customer 102 without any required interaction from the customer 102.

At step 608, registration station 104 may request a message to be sent to customer 102. The message may be processed by verification station 106.

At step 610, mainframe 502 may send the message to customer 102 and send a notice to mainframe 504 at step 612. The notice to mainframe 504 may indicate that the message to customer 102 has been sent. From the notification, mainframe 504 may recognize information received from authentication station 108 regarding the results of the comparison between the message and customer 102, as described below.

At step 614, customer 102 may take the message to authentication station 108. Customer 102 may also take several forms of identification to authentication station 108, if specified in the message. An example of authentication station 108 may be a post office.

At step 616, an operator for authentication station 108 may review the information on the message and compare it against information on the forms of identification offered by customer 102. If the operator is satisfied that customer 102 is properly identified, authentication station 108 may notify mainframe 504 of the verified message. For example, authentication station 108 may process the message as if it were a package and mail the letter to verification station 106.

At step 618, mainframe 504 may receive the verified message from authentication station 108. For example, mainframe 504 may not treat the verified message as a "package," but may forward the verified message to mainframe 502 as a registration request.

At step 620, mainframe 502 may send the verified message to mainframe 502 to registration station 104 to activate the account of customer 102 and start the process of requesting and generating a digital certificate within registration station 104, as illustrated in flowchart 400 of FIG. 4.

At step 622, registration station 104 may generate a digital certificate request and send a confirmation e-mail to customer 102 indicating that a digital certificate is ready. At step 624, customer 102 may access registration station 104 to obtain the digital certificate. At step 626, a digital certificate may be downloaded into the browser of customer 102.

Other embodiments will be apparent to those skilled in the art from consideration of the specification and practice of the appended claims disclosed herein. It is intended that the specification and examples be considered as exemplary only, with a true scope and spirit being indicated by the following claims.

What is claimed is:

1. A method for a secured electronic communication in a network, the method comprising:
   receiving a request for a digital certificate from a user at a registration station, the request including account information associated with the user, the registration station comprising a first storage and a second storage, the first storage containing a request module and a certification authority module, the second storage containing a database;
   storing the account information associated with the user in the database of the second storage;
   sending a message to the user, the message including the account information;
   receiving the message and identification information from the user;
   comparing the account information in the message with the identification information to determine whether the message properly identifies the user;
   based on the comparison, sending a request to generate the digital certificate to the request module in the first storage of the registration station;
   retrieving, by the request module in the first storage of the registration station, the account information associated with the user from the database in the second storage;
   formatting, by the request module, the account information associated with the user into an internal digital certificate request and sending the internal digital certificate request to the certification authority module;
   generating, by the certification authority module, the digital certificate if no errors exist;
   following generation of the digital certificate, storing the digital certificate in the database of the second storage and removing the digital certificate from the first storage.

2. A system for a secured electronic communication, the system comprising:
   a registration computer station configured to:
      receive a request for a digital certificate from a user, the request including account information associated with the user, the registration computer station comprising a first storage and a second storage, the first storage containing a request module and a certification authority module, the second storage containing a database; and
      receive a request to generate the digital certificate after comparison of the account information in the message with the identification information from the user to determine whether the message properly identifies the user; and
   a verification computer station configured to send a message to the user, the message including the account information;
      wherein the request module in the first storage of the registration station is further configured to retrieve the account information associated with the user from the database in the second storage, format the account information associated with the user into an internal digital certificate request, and send the internal digital certificate request to the certification authority module;
      wherein the certification authority module generates the digital certificate if no errors exist,
      wherein the registration station is further configured to store the digital certificate in the database of the second storage and remove the digital certificate from the first storage.

3. The method of claim 1, wherein the account information includes a social security number.

4. The method of claim 1, wherein the message specifies a form of identification.

5. The method of claim 1, wherein generating the digital certificate further comprises:
   determining whether the digital certificate can be issued for the user; and
   generating an error message if the digital certificate cannot be issued.

6. The method of claim 5, wherein generating the error message further comprises:
   categorizing the error message as a fatal error or a nonfatal error;
   processing the request for the digital certificate again, if the error message is categorized as the nonfatal error; and
   aborting the request for the digital certificate, if the error message is categorized as the fatal error.

7. The method of claim 1, further comprising:
generating a root certificate;
storing the root certificate;
bundling the root certificate with the digital certificate to form a certificate bundle; and
forwarding the certificate bundle to the user.

8. The system of claim 2, wherein the request module receives the request for the digital certificate from the user; and
the certification authority module determines whether the request for the digital certificate can be processed.

9. The system of claim 8, wherein the certification authority module further:
generates an error message if the request for the digital certificate cannot be processed.

10. The system of claim 9, wherein the certification authority module further:
processes the request for the digital certificate again if the error message indicates a nonfatal error; and
aborts the request for the digital certificate if the error message indicates a fatal error.

11. The system of claim 2, wherein the account information includes a social security number.

12. The system of claim 8, wherein the request module determines whether an account associated with the request for the digital certificate is ready for processing.

13. The system of claim 12, wherein the request module determines that the account is ready for processing if the account has been activated and the account has been registered for use of the digital certificate.

14. A method, implemented using a computer system, for a secured electronic communication in a network, comprising:
receiving a request for a digital certificate from a user at a registration station, the request including account information associated with the user, the registration station comprising a first storage and a second storage, the first storage containing a request module and a certification authority module, the second storage containing a database;
storing the account information associated with the user in the database of the second storage;
sending a message to the user, the message including the account information;
receiving the message and identification information from the user;
comparing the account information in the message with the identification information to determine whether the message properly identifies the user;
based on the comparison, sending a request to generate the digital certificate to the request module in the first storage of the registration station;
retrieving, by the request module in the first storage of the registration station, the account information associated with the user from the database in the second storage;
formatting, by the request module, the account information associated with the user into an internal digital certificate request and sending the internal digital certificate request to the certification authority module;
generating, by the certification authority module, the digital certificate if no errors exist;
transmitting, using the computer system, the digital certificate to the user; and
following generation of the digital certificate, storing the digital certificate in the database of the second storage and removing the digital certificate from the first storage.

15. The method of claim 14, wherein transmitting the digital certificate to the user further comprises:
bundling a root certificate with the digital certificate, using the computer system, to produce a certificate bundle;
storing the certificate bundle in the database connected to the computer system; and
forwarding the certificate bundle, using the computer system, to the user.

16. The method of claim 14, wherein the account information includes a social security number.

17. The method of claim 14, further comprising:
generating an error message if the digital certificate cannot be generated;
processing the request for the digital certificate again, if the error message indicates a nonfatal error; and
aborting the request for the digital certificate, if the error message indicates a fatal error.

* * * * *